United States Patent
De Rycke et al.

(10) Patent No.: US 12,065,872 B2
(45) Date of Patent: Aug. 20, 2024

(54) TOP FRIT HEAT TREATMENT

(71) Applicant: VKR HOLDING A/S, Hørsholm (DK)

(72) Inventors: Thibault De Rycke, Hørsholm (DK);
Peter Sønderkær, Hørsholm (DK);
Thomas Villiam Sejer Mikkelsen, Hørsholm (DK); Søren Vejling Andersen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 1309 days.

(21) Appl. No.: 16/487,398

(22) PCT Filed: Feb. 19, 2018

(86) PCT No.: PCT/EP2018/053991
§ 371 (c)(1),
(2) Date: Aug. 20, 2019

(87) PCT Pub. No.: WO2018/150016
PCT Pub. Date: Aug. 23, 2018

(65) Prior Publication Data
US 2020/0056421 A1   Feb. 20, 2020

(30) Foreign Application Priority Data

Feb. 17, 2017 (DK) .............................. PA201770108
Feb. 17, 2017 (DK) .............................. PA201770109

(51) Int. Cl.
*C03B 37/012* (2006.01)
*C03C 8/24* (2006.01)
(Continued)

(52) U.S. Cl.
CPC ............ *E06B 3/66314* (2013.01); *C03C 8/24* (2013.01); *C03C 27/08* (2013.01); *E06B 3/6612* (2013.01);
(Continued)

(58) Field of Classification Search
CPC .... E06B 3/6612; E06B 3/6775; E06B 3/6112; E06B 3/6736
See application file for complete search history.

(56) References Cited

U.S. PATENT DOCUMENTS 4,135,936 A * 1/1979 Ballard, Jr. ............... C03C 8/24
501/72
6,221,190 B1 * 4/2001 Shimosato ............ E06B 3/6775
156/104

(Continued)

FOREIGN PATENT DOCUMENTS

| EP | 1403225 A1 | 3/2004 |
|---|---|---|
| EP | 1422204 A1 | 5/2004 |

(Continued)

OTHER PUBLICATIONS

International Search Report; International Application No. PCT/EP2018/053991; International Filing Date—Feb. 19, 2018; Date of Mailing—Jun. 15, 2018.

(Continued)

*Primary Examiner* — Alison L Hindenlang
*Assistant Examiner* — Steven S Lee
(74) *Attorney, Agent, or Firm* — CANTOR COLBURN LLP

(57) ABSTRACT

The present invention relates to a method of producing a vacuum insulated glazing unit, the vacuum insulated glazing unit comprises a first tempered glass pane and a second tempered glass pane arranged in parallel, having a surface of each pane opposing each other with pillars arranged as spacers between the opposed surfaces.
A side frit material is peripherally arranged between the first glass pane and the second glass pane creating an internal void between the glass panes. An evacuation opening is provided in the first glass pane and the evacuation opening comprises an evacuation member, preferably a hollow tube, (Continued)

through which evacuation member the internal void can be evacuated. A top frit material made of lead-free solder frit material comprising a glass content, the top frit material being arranged around the evacuation opening and comprising a surface defining an exterior boundary of the top frit material between the outside of the vacuum insulated glazing unit and the inside of the top frit material, wherein the glass content thereof is substantially in an amorphous state only.

17 Claims, 4 Drawing Sheets

(51) Int. Cl.
| | |
|---|---|
| *C03C 27/08* | (2006.01) |
| *E06B 3/66* | (2006.01) |
| *E06B 3/663* | (2006.01) |
| *E06B 3/673* | (2006.01) |
| *E06B 3/677* | (2006.01) |
| *C03B 37/027* | (2006.01) |
| *C03B 37/03* | (2006.01) |

(52) U.S. Cl.
CPC ...... *E06B 3/66304* (2013.01); *E06B 3/66357* (2013.01); *E06B 3/6736* (2013.01); *E06B 3/6775* (2013.01)

(56) References Cited

U.S. PATENT DOCUMENTS

| | | | | |
|---|---|---|---|---|
| 6,468,610 | B1 * | 10/2002 | Morimoto | E06B 3/66304 52/786.13 |
| 8,137,494 | B2 * | 3/2012 | Cooper | E06B 3/677 264/102 |
| 8,500,933 | B2 * | 8/2013 | Cooper | E06B 3/6775 156/107 |
| 2004/0028846 | A1 * | 2/2004 | Minaai | C03C 10/00 428/34 |
| 2005/0217319 | A1 * | 10/2005 | Yoshizawa | E06B 3/67339 65/34 |
| 2006/0175767 | A1 * | 8/2006 | Collins | E06B 3/6612 277/653 |
| 2012/0148795 | A1 * | 6/2012 | Kwon | H01J 9/40 428/131 |
| 2012/0213953 | A1 * | 8/2012 | Dennis | C03B 23/24 428/34 |
| 2012/0213954 | A1 * | 8/2012 | Dennis | C03C 8/24 501/15 |
| 2013/0108946 | A1 * | 5/2013 | Connelly | C03C 8/02 204/279 |
| 2013/0153551 | A1 * | 6/2013 | Dear | E06B 3/6675 219/121.65 |
| 2015/0030789 | A1 * | 1/2015 | Matsumoto | C03C 3/068 428/34 |
| 2015/0068666 | A1 | 3/2015 | Abe et al. | |
| 2015/0218032 | A1 * | 8/2015 | Hogan | C03C 8/02 65/33.2 |
| 2015/0337106 | A1 * | 11/2015 | Kajihara | C08K 3/22 523/458 |
| 2016/0060158 | A1 * | 3/2016 | Naito | H01B 1/16 501/15 |

FOREIGN PATENT DOCUMENTS

| | | | | |
|---|---|---|---|---|
| JP | 2002128544 | A * | 5/2002 | |
| JP | 3859771 | B2 * | 12/2006 | ........... E06B 3/6775 |
| KR | 100533865 | B1 * | 12/2005 | ............. C03C 8/245 |
| KR | 101289759 | B1 * | 7/2013 | |
| WO | WO-2004099097 | A1 * | 11/2004 | ............. C03C 27/06 |
| WO | WO-2013109456 | A2 * | 7/2013 | ............. C03C 27/06 |
| WO | WO-2016050668 | A1 * | 4/2016 | ............. C03B 23/24 |
| WO | 2016123273 | A1 | 8/2016 | |
| WO | WO-2016123273 | A1 * | 8/2016 | ............. C03C 27/06 |

OTHER PUBLICATIONS

Written Opinion for International Application No. PCT/EP2018/053991; International Filing Date—Feb. 19, 2018; Date of Mailing—Jun. 15, 2018.

* cited by examiner

TOP FRIT HEAT TREATMENT

CROSS REFERENCE TO RELATED APPLICATIONS

This application is a National Stage application of PCT/EP2018/053991, filed Feb. 19, 2018, which claims priority to Danish Application No. PA201770108, filed Feb. 17, 2017, and Danish Application No. PA201770109, filed Feb. 17, 2017, the entire contents of which are incorporated herein by reference.

The invention relates to a method of manufacturing a vacuum insulated glazing (VIG) unit for use in a window having improved durability and quality.

BACKGROUND

Vacuum insulated glazing (VIG) units comprise a compact sandwich structure having two glass panes with a vacuum void in between. The vacuum void provides enhanced thermal insulation and sound insulation resulting in an energy saving and comfort enhancing window pane. In the development of VIG units it is a continuous desire to obtain an optimized VIG units having improved insulating properties and increased lifetime.

In the manufacture of VIG units, it is known to utilize frit materials in sealing the VIG unit. The frit materials will soften at elevated temperatures whereby it may deform into a desired shape or to fill an appointed gap. Thereafter, the frit materials are solidified upon cooling to form a seal. The purpose of a seal made of a frit material is to block any exchange of gas in the gaps and openings between the interior and exterior of the VIG unit. The VIG unit manufacturing method within a furnace traditionally comprises processes such as firing, fusing, sintering, solidifying and baking processes. During the firing process, at which the frit materials are heated, mechanisms such as bonding and fusing together elements, such as the glass panes as well as the glass pane and evacuation member, are carried out. The frit materials generally also undergo sintering, during which process the frit materials are compacted and more solid materials are formed. Upon cooling the frit materials solidifies to desired viscosities and rigidity for the evacuation and baking process. Baking relates to the evacuation and thermal cleaning comprising the process of forcing the glass panes towards each other and evacuating gas such as air and contaminants from the void.

Frit materials for the VIG production, otherwise typically referred to as a solder glass material or a low melting point glass, desirably comprise good bonding and wetting properties to glass and can be processed over a sufficiently broad temperature region and during rapid heating and/or cooling. Lead containing frits are advantageous since they comprise a broad operating range of temperatures in which the lead containing frit materials are processable. Lead-containing frits are therefore easy to work with and match several types of VIG manufacturing processes. The operating range defines the range of temperatures at which the relevant frit material properties, such as the viscosity and wettability, are considered suitable for the VIG unit manufacture and for producing an efficient seal. But lead-containing frits are hazardous materials and therefore not environmental friendly making the VIG unit difficult to recycle.

It is therefore a desire to obtain a VIG unit using lead-free frit materials which provide environmental and recycling advantages. But lead-free frit materials comprise significantly narrower operating range of temperatures compared to lead containing frit materials. The narrow operating range makes the frit materials hard to process and difficult to match to the VIG unit production method which comprises a broad range of temperatures. As a result, the temperatures which can be applied in the VIG unit manufacture become very limited, when using lead-free frit materials. Additionally, tempered glass panes are advantageously of high thermal and mechanical strength due to internal compressive and tensional stresses, but they may be annealed when exposed to sufficient heat for a sufficient amount of time.

Especially during the evacuation process it is advantageous to operate at high temperatures as impurities and contaminants from the frit materials and the glass panes thereby become increasingly released and evacuated from the interior of the VIG unit. But when using lead-free frit materials it is increasingly challenging to obtain these high temperatures without compromising the sealing efficiency since the deformability and fluidity of the frit materials can significantly change over a small temperature region and cause detachment of the frit materials from appointed surfaces within the VIG unit. Furthermore if the VIG unit is heated to temperatures above 400 degrees Celsius there exists a risk of annealing the tempered glass pane and losing the tempered strength.

Patent no. EP1403225A1 discloses a method of producing a vacuum double glazing unit in a furnace. The method comprises the step of providing a pre-crystallized frit around the evacuation opening, and completing the crystallization by heating the entire glazing unit in the furnace to 480 degrees Celsius. The document does not mention lead-free frits, and it is unlikely that this method is suitable for tempered glass, due to the high temperature above 400 degrees Celsius, at which the tempered glass will lose its strength.

Patent no. EP1422204A1 discloses a method of producing a vacuum double glazing unit in a furnace. The provided low melting point glass of the top frit material around the evacuation opening can be in a crystalline or non-crystalline state, but becomes crystalline after the completion of the method where the entire glazing unit is fired to a temperature above 480 degrees Celsius inside the furnace. Due to this high temperature, the method is unsuitable for tempered glass panes. The document does not mention lead-free frits.

THE DISCLOSURE OF THE INVENTION

Disclosed herein is in a first aspect of the invention a method of producing a vacuum insulated glazing unit, the vacuum insulated glazing unit comprising, a first tempered glass pane and a second tempered glass pane arranged in parallel, having a surface of each pane opposing each other, pillars arranged as spacers between the opposed surfaces, a side frit material peripherally arranged between the first tempered glass pane and the second tempered glass pane creating an internal void between the glass panes, an evacuation opening in the first glass pane, the evacuation opening comprising an evacuation member, preferably a hollow tube, through which evacuation member the internal void can be evacuated, and a top frit material made of lead-free solder frit material comprising a glass content, the top frit material being arranged around the evacuation opening and comprising a surface defining an exterior boundary of the top frit material between the outside of the vacuum insulated glazing unit and the inside of the top frit material, wherein the glass content thereof is substantially in an amorphous state only, wherein the method comprises the steps of:

placing an evacuation cup over the evacuation opening, covering a portion comprising at least the evacuation opening, the evacuation member and the top frit material, wherein the evacuation cup comprises a first heat source, and an exhaust opening for evacuating the void, placing the vacuum insulated glazing unit with the evacuation cup in a furnace, heating the top frit material to a heat treatment temperature (Th) by means of the first heat source, maintaining the heat treatment temperature (Th) of the top frit material in the evacuation cup approximately constant for a period of time which is long enough to ensure that glass content near at least the surface of the top frit material is in a state facilitating crystallization, lowering the heat treatment temperature (Th) of the top frit material towards a curing temperature (Tcure) so as to cure the top frit material, and so that the glass content near at least the surface of the top frit material undergoes crystallization, evacuating the void through the evacuation member using a pump connected to the exhaust opening in the evacuation cup, sealing the evacuation member, so as to prevent gas from transferring between the void and the outside of the glass panes thereby obtaining the vacuum insulated glazing unit.

The present method provides an optimized top frit seal which is produced by taking advantage of the benefits of both a crystalline state and an amorphous state of the glass content of the top frit material. Initially the glass content is in the amorphous state only, meaning that the beneficial adhesive properties of the amorphous state can be properly utilized such that it remains attached to the glass pane and the evacuation member during the subsequent method steps and during the lifetime of the VIG unit. Due to the ability of the amorphous glass to soften at lower temperatures than crystalline glass, the suitable wettability and viscosity for the VIG unit manufacture process can be obtained at lower temperatures compared to when using a frit material comprising a crystalline glass content. Furthermore, the disordered structure of the amorphous glass content provides different vibrational conditions for the individual elements of the glass content, which in turn means that the amorphous glass does not melt at a well-defined narrow temperature range, but instead the material softens across a large range of temperatures, making it advantageously processable. The amorphous state of the glass content therefore simplifies the bonding process of ensuring that the top frit material adheres and bonds well to the surfaces to be bonded. The top frit material may thereby create a bond between an outer surface of the evacuation member and a surface of a peripheral edge of the evacuation opening opposing the outer surface of the evacuation member.

The crystallization of the glass content is executed during the VIG unit manufacturing method, after the top frit material has been heated at the heat treatment temperature (Th) for a suitable amount of time. Crystalline glass comprises intermolecular forces which are highly uniform, providing a well-defined melting range within a narrow temperature range. The crystalline solids melt at higher temperatures than amorphous solids as the crystalline state is a more stable than the amorphous state and more energy is needed to melt the crystalline glass content compared to the amorphous glass content. Advantageously, the wetting and bonding of the top frit material to the glass surfaces is created prior to crystallization. If the crystallization process is initiated prematurely, the bonding process may be negatively affected leading to an incomplete fusing action.

The present method provides an optimized hermetic top frit seal with high thermal and vacuum stability. The crystallized glass content having a narrow melting range located at a high temperature ensures that the top frit seal has a large thermal stability, i.e. it can withstand a broad range of temperatures below the melting range without causing leaks and failure of the seal, such as softening and detachment from the glass surfaces.

The resulting top frit seal comprising a crystalline glass content makes it possible to execute the evacuation and thermal cleaning process of the void at advantageously high temperatures without compromising the durability and quality of the top frit seal. The crystallized top frit seal thereby provides an efficient thermal cleaning of the void during evacuation of the void. Frit materials may tend to foam during the evacuation process possibly due to the frit materials being too soft and allowing the gas to escape from within the frit material leaving behind pores and cavities. These pores and cavities may become available routes for the gas between the interior and exterior of the VIG unit. The heat treatment of the top frit material has shown to reduce this foaming effect by crystallizing at least the glass content within the surface of the top frit material during the manufacturing method which shifts the melting range of the frit material towards higher temperatures and provide a leak-free seal.

Tempered glass panes are advantageously of high thermal and mechanical strength due to internal compressive and tensional stresses but may be annealed when exposed to sufficient heat for a sufficient amount of time.

Disclosed in the second aspect of the invention is a method of producing a vacuum insulated glazing unit, the vacuum insulated glazing unit comprising, a first glass pane and a second glass pane arranged in parallel, having a surface of each pane opposing each other, pillars arranged as spacers between the opposed surfaces, a side frit material peripherally arranged between the first glass pane and the second glass pane creating an internal void between the glass panes, an evacuation opening in the first glass pane, the evacuation opening comprising an evacuation member, preferably a hollow tube, through which evacuation member the internal void can be evacuated, and a top frit material made of lead-free solder frit material arranged around the evacuation opening, wherein the method comprises the steps of:

placing an evacuation cup over the evacuation opening, covering a portion comprising at least the evacuation opening, the evacuation member and the top frit material, wherein the evacuation cup comprises a first heat source, and an exhaust opening for evacuating the void, placing the vacuum insulated glazing unit with the evacuation cup in a furnace, heating the side frit material and the top frit material to a softening temperature (Ts) by means of the furnace, additionally, heating the top frit material to a heat treatment temperature (Th) by means of the first heat source, wherein the heat treatment temperature (Th) is larger than the softening temperature (Ts) by at least 5 degrees Celsius, maintaining the heat treatment temperature (Th) of the top frit material and the softening temperature (Ts) of the side frit material for at least 3 min, lowering the heat treatment temperature (Th) of the top frit material and the softening temperature (Ts) side frit material towards a curing temperature (Tcure), evacuating the void through the evacuation member using a pump connected to the exhaust opening in the evacuation cup, sealing the evacuation member, so as to prevent gas from transferring between the void and the outside of the glass panes and thereby obtaining the vacuum insulated glazing unit.

By the above method and the local heat treatment of the top frit material to a larger temperature than the softening temperature (Ts), the top frit material produces an optimized hermetic top frit seal with high thermal and vacuum stability. The top frit seal is advantageously leak-free and rigid while maintaining its beneficial adhesive properties such that it remains attached to the glass pane and the evacuation member during the subsequent method steps and the lifetime of the VIG unit. Additionally the top frit seal is lead free, proving recyclable and environmental advantages.

Due to the present method and the resulting top frit seal with optimized thermal and vacuum stability, it is possible to execute the evacuation and thermal cleaning process of the void at advantageously high temperatures providing an efficient thermal cleaning of the void during evacuation of the void, without compromising the durability and quality of the top frit seal.

Disclosed in the third aspect of the invention is a vacuum insulated glazing unit comprising:
- a first tempered glass pane and a second tempered glass pane arranged in parallel, having a surface of each pane opposing each other,
- pillars arranged as spacers between the opposed surfaces,
- a side seal peripherally arranged between the first tempered glass pane and the second tempered glass pane creating an internal void between the glass panes,
- an evacuation opening comprising an evacuation member, which after having served as an evacuation channel for creating an evacuated internal void, has been closed, and
- a top frit seal made of lead-free solder frit material comprising a glass content, the top frit seal being arranged around the evacuation opening and providing a hermetic seal between the evacuation opening and the evacuation member such that gas is prevented from transferring between the internal void and the outside of the vacuum insulated unit, wherein the top frit seal comprises an outer surface and an inner part, wherein the outer surface is defined as the boundary layer of the top frit seal between the top frit seal and the outside of the vacuum insulated unit and wherein the glass content within the outer surface is in a crystalline state and the glass content within the inner part is in an amorphous state.

Disclosed in the fourth aspect of the invention is a vacuum insulated glazing unit comprising:
- a first tempered glass pane and a second tempered glass pane arranged in parallel, having a surface of each pane opposing each other,
- pillars arranged as spacers between the opposed surfaces,
- a side seal peripherally arranged between the first tempered glass pane and the second tempered glass pane creating an internal void between the glass panes,
- an evacuation opening comprising an evacuation member, which after having served as an evacuation channel for creating an evacuated internal void, has been closed, and
- a top frit seal made of lead-free solder frit material comprising a glass content, the top frit seal being arranged around the evacuation opening and providing a hermetic seal between the evacuation opening and the evacuation member such that gas is prevented from transferring between the internal void and the outside of the vacuum insulated unit, wherein the top frit seal wherein the glass content within the top frit seal is in a superficial crystalline state.

By superficial crystalline state is meant that a crystalline layer is formed on an outer surface of the top frit seal. The thickness of the crystalline layer may vary depending on e.g. amount the time which the vacuum insulated glazing unit has been heated, the temperature which the vacuum insulated glazing unit has been exposed to, or a combination of thereof. The top frit seal positioned underneath the crystalline layer in the superficial crystalline state may be in an amorphous state.

Disclosed in the fifth aspect of the invention is a vacuum insulated glazing unit comprising:
- a first tempered glass pane and a second tempered glass pane arranged in parallel, having a surface of each pane opposing each other,
- pillars arranged as spacers between the opposed surfaces,
- a side seal peripherally arranged between the first tempered glass pane and the second tempered glass pane creating an internal void between the glass panes,
- an evacuation opening comprising an evacuation member, which after having served as an evacuation channel for creating an evacuated internal void, has been closed, and
- a top frit seal made of lead-free solder frit material comprising a glass content, the top frit seal being arranged around the evacuation opening and providing a hermetic seal between the evacuation opening and the evacuation member such that gas is prevented from transferring between the internal void and the outside of the vacuum insulated unit, wherein the top frit seal wherein the glass content within the top frit seal is in a mixed crystalline and amorphous state.

By mixed crystalline and amorphous state is meant a state where the glass content within the top frit seal is partly in a crystalline state and partly in an amorphous state. The mixed crystalline and amorphous state also includes a superficial crystalline state, i.e. state where a crystalline layer is formed on an outer surface of the top frit seal, combined with a mixed crystalline and amorphous state of the top frit seal positioned underneath the outer crystalline layer.

Disclosed in the sixth aspect of the invention is a vacuum insulated glazing unit comprising:
- a first tempered glass pane and a second tempered glass pane arranged in parallel, having a surface of each pane opposing each other,
- pillars arranged as spacers between the opposed surfaces,
- a side seal peripherally arranged between the first tempered glass pane and the second tempered glass pane creating an internal void between the glass panes,
- an evacuation opening comprising an evacuation member, which after having served as an evacuation channel for creating an evacuated internal void, has been closed, and
- a top frit seal made of lead-free solder frit material comprising a glass content, the top frit seal being arranged around the evacuation opening and providing a hermetic seal between the evacuation opening and the evacuation member such that gas is prevented from transferring between the internal void and the outside of the vacuum insulated unit, wherein lead-free solder frit material comprises at least one metal oxide, which upon heating to temperatures above 380 degrees C. has modified properties of the top frit material, such as the coefficient of thermal expansion (CTE), softening point and adhesive properties.

By mixed crystalline and amorphous state is meant a state where the glass content within the top frit seal is partly in a crystalline state and partly in an amorphous state. The mixed crystalline and amorphous state also includes a superficial crystalline state, i.e. state where a crystalline layer is formed on an outer surface of the top frit seal, combined with a mixed crystalline and amorphous state of the top frit seal positioned underneath the outer crystalline layer.

Disclosed in the seventh aspect of the invention is a manufacturing facility comprising a production unit for producing a vacuum insulated glazing unit using the method according to the first or second aspect of the invention. The production unit may comprise an evacuation cup comprising a first heat source and a pump for evacuating a void between glass panes in the vacuum insulated glazing unit through the evacuation cup.

Disclosed in the eighth aspect of the invention is a manufacturing facility comprising a production unit for producing a vacuum insulated glazing unit according to the third, fourth, fifth or sixth aspect of the invention using the method according to the first or second aspect of the invention.

Disclosed in the ninth aspect of the invention is a manufacturing facility comprising a production unit for producing a vacuum insulated glazing unit according to the third, fourth, fifth or sixth aspect of the invention using the method according to the first or second aspect of the invention, wherein the production unit comprises an evacuation cup comprising a first heat source, a furnace for heating the vacuum insulated glazing unit with the evacuation cup positioned over an evacuation opening in the vacuum insulated glazing unit, and a pump for evacuating a void between glass panes in the vacuum insulated glazing unit.

In one or more aspect of the method of the invention according to the first and/or second aspect of the invention, the first heat source inflicts an increased temperature in a very small area of the VIG unit, and it is possible to achieve an efficient top seal while minimizing the overall effect of the temperature increase on the VIG unit. This is advantageous when using tempered glass since the area of the VIG unit exposed to the heat treatment temperature (Th) is minimized due to the use of the evacuation cup and the first heat source. This in turn minimizes any loss of tempered strength due to thermal annealing within the glass panes where the internal stresses are released, and the glass panes become similar to regular glass panes. Furthermore, the side seal frit material become unaffected by the local heating by the first heat source and the side frit material can maintain its adhesive and deformable properties suitable for the joining of the glass panes.

In one or more aspects of the invention, the glass content of the side frit material is initially in an amorphous state and remains in an amorphous state during and after the execution of the method of the present invention.

Due to the above advantages, the present invention provides an optimized manufacturing method for making a vacuum insulated glazing (VIG) unit having improved durability and quality. Additionally the VIG unit made with lead-free top frit seal and lead-free side frit seal provides recyclable and environmental advantages.

In one or more aspect, several VIG units may be manufactured simultaneously in the furnace each placed in the furnace each having an evacuation cup.

In one or more aspect of the invention, the heat treatment at the heat treatment temperature (Th) may additionally soften the top frit material and an adhering connection is established with the evacuation member and the evacuation opening The minimum heat treatment time stated corresponds to the required time for the top frit material to solder the evacuation member to the evacuation opening and establish an efficient seal being improvingly resistant to thermal and mechanical shock.

The deviation of the temperatures is calculated based on the average heat treatment temperature (Th) and the average softening temperature (Ts) over the time period of the relevant method step.

In one or more aspect of the present invention, the joining and bonding processes, during the heat treatment of the frit materials, are dynamic processes and requires a certain minimum period of time to fulfil. Therefore the top frit material is maintained at the heat treatment temperature (Th) for at least 3 minutes. Preferably also the side seal material is maintained at the softening temperature (Ts) for at least 3 minutes.

The top frit material and the side frit material (hereafter referred to as the frit materials) are generally chosen based on their processability and compatibility with the temperature profile and the pressures used in the VIG unit manufacturing method. In one or more aspect of the invention, the top frit material should be in a sufficiently softened state when heated to the softening temperature (Ts) i.e. the materials should be viscous enough to remain in their original positions but softened enough to be able to deform. This applies especially when the relevant glass panes of the VIG unit are joined and sealed.

Furthermore the glass content of the top frit material should preferably be in a sufficient melted state when heated at the heat treatment temperature (Th) and start to crystallize upon cooling.

In one or more aspect of the invention, the heat treatment at the heat treatment temperature (Th) is provided for a minimum heat treatment time corresponding to the required time for the top frit material to melt and solder the evacuation member to the evacuation opening and establish a phase transition towards a crystalline state of at least the glass content near the surface of the top frit material. These are dynamic processes and require a certain minimum period of time to fulfil. Therefore the top frit material is maintained at the heat treatment temperature (Th) for at least 5 minutes.

The side frit material and the top seal frit material (hereafter collectively referred to as the frit materials) may be of the same frit type or they may be made of different frit types. Preferably the frit materials are in a paste form which can be readily applied peripherally on at least one of the glass panes before assembling and around the evacuation opening.

Preferably the top frit material is in a paste form which can be readily applied around the opening within the first glass pane.

In one of more aspects, the pillars are made of a material having a high compressible strength, for example they could be made from metal, such as stainless steel, or glass, glass frit or ceramic, or a combination thereof. The pillar height determines the minimum distance between the inner surfaces of the glass panes, and may preferably be between 0.1 and 0.4 mm in height, preferably around 0.2 mm in height. The pillar spacing is preferably the minimum spacing required in order for the pillars to withstand the atmospheric pressure exerted on the VIG unit such that maximum visibility through the panes and better thermal insulation are obtained.

Furthermore, the pillars may create local indentation stress which grows cracks and can affect the lifetime of the VIG unit. As a result of using tempered glass a lower amount of pillars is needed between the panes in order to withstand the atmospheric pressure on the panes and minimize bending of the panes towards the void. With tempered glass the pillars may be separated with a distance above 35 mm, such as 40 mm or such as 50 mm, thereby minimizing the visible distraction that may be experienced when looking through the glass and minimizing the heat transfer between the glass panes. In one or more aspects, the pillar spacing is between 20-50 mm, such as 40 mm.

The pillars may be of any shape sufficient for the pillars to function, such as cylinder, pyramid, conical, circular, rounded shape or a combination thereof. Furthermore, the shape may be a complex shape manufactured using an aggregation of different or similar shapes.

The glass panes may be made of glass type from group of different glass types comprising glass types such as float glass, strengthened glass such as tempered glass and laminated glass.

In one or more aspect, the first glass pane and the second glass pane are tempered glass panes.

In one or more aspects, the evacuation opening may comprise a single diameter or a dual diameter hole, depending on the evacuation member and glazing material used. The evacuation opening may be created at any position on the surface of the first glass pane, but it may preferably be positioned near the side edge of the first glass pane, such as near the corner of the first glass pane, so that the evacuation opening with the frit material and the evacuation member does not obscure the visibility through the VIG unit in areas near in the middle of the first glass pane.

In one or more aspects, the evacuation member may be of any structure or material which will allow gas to transfer between the interior to the exterior of the VIG unit during the evacuation of the void and which is able withstand the temperature profile of the method without substantial deformation or detachment. In a preferred aspect, the evacuation member may be made of a material having a coefficient of thermal expansion (CTE) which is similar to the CTE of the frit material, and preferably also the glass pane.

In one or more aspects, the evacuation cup produces a hermetic contact to the first glass pane. Furthermore the evacuation cup is preferably of minimal size such that a minimum area of the VIG unit is exposed to the additional local heating to the heat treatment temperature (Th). The exhaust opening is configured to be connected to a pump suitable for evacuating the void through the interior of the evacuation cup.

In one or more aspect of the invention, the first heat source may comprise a ceramic heater having a ceramic heat element or an electric heater or alternatively the heat source may comprise a laser located distant and directed to top frit material. Other heat sources such as visible light, microwaves, IR or induction heating are also conceivable. The first heat source may comprise more than one of the same or similar types of heat source. A combination of different heat sources may also be comprised in the first heat source. The heat source for increasing the temperature of the portion enclosed by the evacuation cup may be positioned inside the wall of the evacuation cup. This position of the heat source may provide for a more homogenous heating of the portion. The heat source provides temperatures within the portion enclosed by the cup which correspond to the temperatures necessary for the top frit material to reach and be maintained at the heat treatment temperature (Th) and subsequently cooled to the curing temperature (Tcure). In one or more aspects of the invention the cooling of the frit materials towards the curing temperature (Tcure) is done in stages or the temperature may continuously decrease.

In one or more aspects, the sealing method of the evacuation member is dependent on the type of evacuation member used. In the example that the evacuation member is a metal tube, the walls of metal tubes may be squeezed at a protruding end in order to close the opening of the metal tube. Glass tubes may be melted in order to be sealed.

In one or more aspects of the present invention, the evacuation member is a tube, preferably a glass tube, placed connected with the evacuation opening and protruding outwardly from the first tempered glass pane. The connection between the evacuation opening and the glass tube may at least be provided by the top frit material.

In a further aspect of the invention, the top frit material is provided around the tube and preferably donut-shaped. The glass tube can then be positioned in the centre of the top frit material, and preferably in connection with the top frit material.

In one or more aspects, the glass tube and the frit material are connected prior to being positioned over the evacuation opening.

In one or more aspects, the top frit material comprises at least one solvent and at least one binder material.

According to the present invention, the top frit material may comprise at least one metal oxide such as vanadium oxide ($V_2O_5$), bismuth oxide ($Bi_2O_3$), tellurium dioxide ($TeO_2$) or zinc oxide (ZnO). The frit material may additionally also comprise aluminium oxide ($Al_2O_3$), molybdenum trioxide ($MoO_3$) or tungsten trioxide ($WO_3$) or a combination thereof. The metal oxides are able to modify certain properties of the top frit material such as the coefficient of thermal expansion (CTE), softening point and adhesive properties. Metal oxides may additionally have an influence on the crystal formation of the glass content. The coefficient of thermal expansion (CTE) of the frit materials is modified to be compatible with the glass pane CTE. This has the advantage that the temperature changes have less impact on the vacuum insulated glazing (VIG) unit.

In one or more aspect, the heat treatment temperature (Th) of the top frit material in the evacuation cup is lowered towards the curing temperature (Tcure) such that only the glass content near the surface of the top frit material undergoes crystallization. The surface of the top frit material may experience a change in pressure and/or temperature to a larger degree than the rest of the top frit material, and therefore it is advantageous that at least the surface of the top frit material is strengthened in order to withstand the applied heat during the sealing process and the change in pressure during the evacuation process. In one or more aspects, the top seal produced by the top frit material is substantially solid and prevent the glass panes from working relative to each other and reduce the movement of the pillars. This has the advantage that the glass panes curve less due to temperature difference between inside and outside of the VIG unit (known as temperature differential) and this can help distribute the stresses in the VIG unit.

In one or more aspect, the heat treatment temperature (Th) of the top frit material in the evacuation cup is lowered towards the curing temperature (Tcure) such that at least 80% of the glass content near the surface of the top frit material undergoes crystallization. The top frit material surface will comprise large thermal and mechanical strength as only small regions of the surface will contain amorphous glass portions.

In one or more aspect, the heat treatment temperature (Th) of the top frit material in the evacuation cup is lowered towards the curing temperature (Tcure) such that at least 50% of the glass content within the top frit material undergoes crystallization.

In one or more aspect, the heat treatment temperature (Th) of the top frit material in the evacuation cup is lowered towards the curing temperature (Tcure) such that substantially the entire glass content in the top frit material undergoes crystallization.

In one or more aspect, the top frit seal produced is characterized as a devitrifying seal, meaning it is made of a frit material comprising a glass content, where the glass content of the frit material is initially in an amorphous state, but during the sealing process some or all of the glass content crystallizes and forms a rigid seal. The molecular structure and characteristics of the material have changed and it will not soften or deform if reheated, even if reheated to the same temperatures of the sealing process.

In one or more aspect, the top frit material provides a hermetic seal between the evacuation member and the evacuation opening during the method step of lowering the heat treatment temperature (Th) towards the curing temperature (Tcure) and during the subsequent method steps. The top frit material closes any gaps present between the evacuation member and the evacuation opening after the heat treatment step, during the step of lowering the top frit temperature. The hermetic top frit seal may only be partially formed after placing the top frit material around the opening or during the prior method steps such as during the heating the top frit material to the heat treatment temperature (Th).

In one or more aspect, the top frit material provides a hermetic seal between the evacuation member and the evacuation opening during the method step of maintaining the top frit material at the heat treatment temperature (Th) and during the subsequent method steps. I.e. the hermetic top frit seal is provided prior to the method step of lowering the temperature towards the curing temperature (Tcure) and is thereby efficient when cooled towards the curing temperature (Tcure), when exposed to low pressures near vacuum pressure, and in the final VIG unit.

In one or more aspect, the top frit material provides a hermetic seal between the evacuation member and the evacuation opening during the method step of heating the top frit material to the heat treatment temperature (Th) and during the subsequent method steps. The hermetic seal may be established upon melting the top frit material.

In one or more aspect, the top frit material is substantially foam-free during at least the evacuation step. The crystallization of the glass content of the top frit material shifts the melting temperature towards higher temperatures, which makes it possible to expose to the top frit material to vacuum pressure at higher temperatures during evacuation without foaming the frit material. As the top frit material is prevented from foaming the occurrence of pores within the resulting top frit seal is significantly minimized. Such pores may provide a pathway through which gas can transfer between the void and the outside of the VIG unit during the evacuation step, sealing step and during the lifetime of the VIG unit.

In one or more aspects, the heat treatment temperature (Th) is between 380-460 degrees Celsius, such as between 400-440 degrees Celsius, or such as between 410-430 degrees Celsius. The temperatures within the stated temperature ranges correspond to energies which are large enough to melt the glass content of the top frit material and to allow a rearrangement of the molecular elements of the glass content into a crystalline structure.

Furthermore the heat treatment temperature (Th) is preferably maintained for at least 10 minutes, such as for at least 25 minutes, such as for at least 35 minutes.

The heat treatment temperature (Th) of the top frit material may for example be set to 450 degrees Celsius for at least 20 minutes or 30 minutes. In another example, the heat treatment temperature (Th) may be set to 420 degrees Celsius for at least 20 minutes or 30 minutes. In yet another example the heat treatment temperature (Th) may be set to 400 degrees Celsius for at least 30 minutes or 35 minutes. The heat treatment temperature (Th) may vary with approximately ±5 degrees Celsius over the course of the heat treatment. Preferably the optimum heat treatment time stated corresponds to the required time for the glass content of the top frit material to sufficiently melt and to solder the evacuation member to the evacuation opening. The amount of energy added to the top frit material should be sufficient to allow the crystallization process to occur upon solidification.

The present method of manufacturing a VIG unit comprising tempered glass panes can be manufactured using the above temperatures ranges without eliminating the tempered strength because the evacuation cup comprising the first heat source only inflicts a temperature above 400 degrees Celsius in a very small area of the tempered glass pane. The crystallized glass content of the top frit seal can thereby be achieved while minimizing the overall loss of tempered strength in the glass pane. The benefits of the obtained optimized seal have shown to outweigh the local loss of strength of the glass.

In one or more aspects, the heat treatment temperature (Th) is maintained for a period of time between 10 and 60 minutes, such as between 25 and 50 minutes, such as between 35 and 45 minutes, such as between 10 and 30 minutes or such as between 10 and 20 minutes. Advantageously, for the selected heat treatment temperature (Th) there may exist an upper limit to the heat treatment time necessary for obtaining the desired bonding property and heat treatment effect of the top frit material. The heat treatment temperature (Th) of the top frit material may for example be set to 410 degrees Celsius for a period of time between 25 to 50 minutes or the heat treatment temperature may be set to 420 degrees Celsius for a period of time between 35 to 60 minutes.

In one or more aspect of the invention, the side frit material is heated to a softening temperature (Ts) by at least the furnace. Additional heat sources may be present in the furnace, such as IR, visible light, microwave, induction, ceramic or electric heating, directed to the side frit material.

In one or more aspect of the invention, the side frit material is heated at the softening temperature (Ts) during the method steps of heating the top frit material to the heat treatment temperature (Th) and maintaining the heat treatment temperature (Th) of the top frit material in the evacuation cup approximately constant. The method comprises the steps of simultaneously heating two different parts of the VIG unit to two different temperatures. Preferably the side seal material is maintained at the softening temperature (Ts) for at least 5 minutes or approximately for at least the same time as the top frit material is maintained at the heat treatment temperature (Th).

The side frit material may be generally chosen based on its processability and compatibility with the temperature profile and the pressures used in the VIG unit manufacturing method. In one or more aspect of the invention, the side frit material should be in a sufficiently softened state when heated to the softening temperature (Ts) i.e. the materials should be viscous enough to remain in their original positions but softened enough to be able to deform. The side frit material and the top seal frit material (hereafter collectively referred to as the frit materials) may be of the same frit type or they may be made of different frit types. Preferably the frit materials are in a paste form which can be readily applied peripherally on at least one of the glass panes before assembling and around the evacuation opening.

Frit material may experience problem with their bonding ability when exposed to radical temperature changes above its softening point. In one or more aspects, the softening temperature (Ts) is maintained approximately constant during the method steps of heating the top frit material to the heat treatment temperature (Th) and maintaining the heat treatment temperature (Th) of the top frit material in the evacuation cup approximately constant. This allows for a more uniform heating of the side frit material and top frit material and large temperature variations within the frit materials are minimized.

In one or more aspect of the present invention, the heat treatment temperature (Th) provided by the first heat source is larger than the softening temperature (Ts) provided by at least the furnace.

By the present method the glass content of the side frit material may be prevented from obtaining the necessary energy to initiate the crystallization process as the heating to the heat treatment temperature (Th) is only obtained locally, within the portion enclosed by the evacuation cup. Advantageously, the side frit material may maintain its deformability during the baking process such that the glass can be forced against each other during the evacuation of the void, until the pillars are sandwiched between the glass panes and preventing the glass panes from moving any further.

In one or more aspect, the side frit material provides a vitreous seal meaning it is made from a frit material comprising a glass content, where the glass content of the frit material remains in its amorphous state after forming the seal and the seal will soften and deform if reheated.

In one or more aspect, the heat treatment temperature (Th) is larger than the softening temperature (Ts) by at least 10 degrees Celsius, such as by at least 20 degrees Celsius, or such as by at least 40 degrees Celsius. The additional heating provides the top frit material with sufficient energy to allow the phase transition and to initiate and promote the crystallization process within the glass content of the top frit material while the glass content of the side frit material lacks the needed energy to initiate the phase transition. The temperature difference is based on the average heat treatment temperature (Th) and the average softening temperature (Ts), during the corresponding time period.

Additionally or alternatively the heat treatment temperature (Th) may be larger than the softening temperature (Ts) by at least 5%, such as by at least 10%, or such as by at least 15%. The temperature difference is based on the average heat treatment temperature (Th) and the average softening temperature (Ts), during the corresponding time period.

In one or more aspect, the difference between the heat treatment temperature (Th) and the softening temperature (Ts) is no larger than 100 degrees Celsius. Large temperature deviation across the tempered glass panes may be disadvantageous, as it can cause unwanted differences in expansion rates across the glass pane producing undesirable stresses, which may lead to breakage. In order to promote a long lifetime of the VIG unit, large temperature deviations are therefore preferably avoided.

In one or more aspect, the softening temperature (Ts) is between 320-390 degrees Celsius, such as between 330-370 degrees Celsius, or such as between 340 and 360 degrees Celsius. For example, the softening temperature may be set to 350 degrees Celsius or to 375 degrees Celsius. The temperature stated is the average softening temperature (Ts) of the side frit material. The temperature may vary with approximately ±5 degrees Celsius over the course of the corresponding heating period.

In one or more aspect, the parts of the glass panes, which are not covered by the evacuation cup, are maintained at a temperature approximately below 400 degrees Celsius during at least the method steps of heating the top frit material to the heat treatment temperature (Th) and maintaining the heat treatment temperature (Th) of the top frit material in the evacuation cup approximately constant. The first heat source of the evacuation cup provides a local heating of the portion covered by the evacuation cup, so that the remainder of the VIG unit is generally not affected by any radical temperature changes relative to the temperature provided by the furnace. The temperature of the remaining VIG unit is maintained below 400 degrees Celsius mainly to decrease the risk of failure of the peripheral side frit material or the tempered glass strength or the Low-E coating at any point of the remainder of the VIG unit. Generally tempered glass is significantly annealed at above 400 degrees Celsius when maintained for approximately 30 minutes. Therefore when using tempered glass it is generally desirable to use a VIG manufacturing process comprising temperature profiles below 400 degrees Celsius for the largest achievable area of the VIG unit.

In one or more aspect, the curing temperature (Tcure) is between 275-380 degrees Celsius, such as between 290-370 degrees Celsius, or such as between 300-360 degrees Celsius. The curing temperature (Tcure) may for example be around 350 degrees Celsius ±10 degrees Celsius.

The cooling of the glass content within the top frit material towards the curing temperature (Tcure) may promote the creation of the necessary conditions for crystal growth. The rate of crystal growth may generally be increasing as the temperature of the glass content within the top frit material is decreasing. But the cooling process may be adjusted to produce a top frit seal having a glass content which is either completely crystallized or partially crystallized. In the case, that the glass content is only partially crystallized, the glass content may comprise portions of amorphous glass.

In one or more aspect, the evacuation of the void is initiated while the temperature of the side frit material and the temperature of the top frit material are lowered towards the curing temperature (Tcure).

In one or more aspect, the evacuation of the void is initiated while the temperature of the side frit material and the temperature of the top frit material are at the curing temperature (Tcure). That is, the evacuation may be initiated before the temperature of the frit materials reach the curing temperature (Tcure) or the evacuation may be initiated when the frit material temperatures have reached the curing temperature (Tcure). As an example, if the curing temperature (Tcure) is 330 degrees Celsius, the evacuation may be initiated when the temperatures of the frit materials are higher than 330 degrees Celsius providing that the viscosity of the side frit material is optimal for the evacuation process. The viscosity of the side frit material should provide a deformable state, which permit the glass panes to move towards each other without creating any undesirable internal stresses along the glass panes during the evacuation of the void. Furthermore the viscosity should be sufficiently high to withstand vacuum pressure and being sucked into the void.

Advantageously, a high evacuation temperature accommodates a high thermal cleaning temperature. The optimum thermal cleaning of the void during evacuation is preferably at a temperature of at least 275 degrees, preferably at least 285 degrees such as at least 300 degrees, such that the contaminants and impurities within the void are in a gaseous state and can be more easily removed during evacuation of the void. The impurities and contaminants may originate from elements of the VIG unit such as the glass and the frit materials.

The evacuation may be initiated after the initiation of the crystal growth within the glass content of the top frit material. Preferably the evacuation is initiated after at least the glass content near the surface of the top frit material has sufficiently crystallized, such that foaming and deterioration of the top frit material is prevented upon evacuation of the void.

In one or more aspects, the temperature of the top frit material and/or the temperature of the side frit material are maintained at the curing temperature (Tcure) for at least 5 minutes, such as for at least 10 minutes, before the initiation of the evacuation of the void.

In one or more aspect, the temperature of the top frit material and/or the temperature of the side frit material are lowered towards the curing temperature (Tcure) or maintained at the curing temperature (Tcure) for at least 5 minutes, such as for at least 10 minutes, before the initiation of evacuation of the void. The frit materials may be allowed to sufficiently settle, before being exposed to a dramatic change in pressure. Preferably at least the glass content near the surface of the top frit material may be allowed to sufficiently crystallize before the evacuation of the void. The evacuation may be initiated while the temperatures of the frit materials are still continuously decreasing providing that at least 10 minutes have elapsed from the initiation of the decrease in side frit material temperature and top frit material temperature. Or the evacuation may be initiated after the frit materials have been maintained at the curing temperature (Tcure) for at least 10 minutes.

In one or more aspect, the evacuation of the void is provided through the evacuation member only. In this manner the only pathway between the void and the outside of the VIG unit is through the evacuation member and it is therefore the only member which will need to be sealed after the preferred pressure within the void is obtained.

In one or more aspect, the void is evacuated to a pressure of no higher than 0.001 mbar, such as no higher than 0.0005 mbar or no higher than 0.0001 mbar. Thus, the void is preferably evacuated to a pressure below 0.001 mbar, such as below 0.0005 mbar or below 0.0001 mbar. The pressure is measured directly prior to the sealing of the evacuation member.

In one or more aspect, the first heat source comprises a ceramic heat source, made of high melting point ceramic material. The heat source may e.g. comprise a ceramic component for example silicon nitride and/or aluminium nitride. One advantage of using ceramic heaters is that ceramic heaters is regarded as a durable and clean heat source compared to metal heaters, which can produce metal deposits on the glass panes. Furthermore the ceramic heater transfers heat through heat radiation such as within the infrared red region and they are suitable heaters for vacuum use. Ceramic heaters can heat up quickly and provide a more constant heat profile and a ceramic heater is more compatible for heating to multiple temperatures.

In one or more aspect, the evacuation cup comprises a second heat source, preferably comprising a ceramic heat source. The heat source may for example comprise an electric heater or ceramic heater in the cup. Or the heat source may comprise a laser located distant and directed to area to be heated. Other heat sources such as visible light, microwaves, IR or induction heating are also conceivable. The second heat source may comprise more than one of the same or similar types of heat source such as two or more ceramic heat sources or two or more IR heat sources. A combination of different types of heat sources may also be used.

In one or more aspect, the method step of sealing the evacuation member is obtained by heating the evacuation member to a sealing temperature (Tseal) and subsequently melting at least a part, preferably the tip, of the evacuation member. The sealing temperature may be any temperature sufficient to melt the evacuation member to a degree sufficient to close the evacuation member. The melting of the tip preferably decreases the protruding height of the tip from the glass pane and closes the opening of the tube.

In one or more aspect, the method step of sealing the evacuation member is obtained using the first heat source or the second heat source. The sealing temperature (Tseal) may be provided by the first heat source or the second heat source. The second heat source may be a dedicated heat source for closing the evacuation member opening. Alternatively the sealing temperature (Tseal) for sealing the evacuation member opening may be obtained using the first heat source of the evacuation cup i.e. the same heat source used to heat the top frit material to the heat treatment temperature (Th). The heat source for closing the evacuation member opening will need to work under vacuum because the evacuation member to be sealed is exposed to vacuum.

In one or more aspect, the sealing temperature (Tseal) is between 800-1200 degrees Celsius, such as between 900-1100 degrees Celsius, for less than a minute, such as for approximately 20 seconds. As an example, if the tube is a glass tube, the tip of the tube will melt when exposed to the sealing temperature within this range and the specified heating time. This provides an efficient and rapid closure of the evacuation member, after which the void is completely enclosed.

In one or more aspect of the present invention, the top frit material treated at the heat treatment temperature (Th) and subsequently cooled, creates a top frit material sufficiently resistant to the heat applied during the sealing of the evacuation member. As extra protection for the integrity of the top frit material as a sealant for the evacuation opening, a metal shield protecting the top frit material can be provided.

Disclosed herein is also a vacuum insulated glazing unit comprising a first tempered glass pane and a second tempered glass pane arranged in parallel, having a surface of each pane opposing each other, pillars arranged as spacers between the opposed surfaces. The pillars may made of a material having a high compressible strength, for example they may be made from metal, such as stainless steel, or glass, glass frit or ceramic, or a combination thereof. The pillar height determines the minimum distance between the inner surfaces of the glass panes, and may preferably be between 0.1 and 0.4 mm in height, preferably around 0.2 mm in height. The pillar spacing is preferably the minimum spacing required in order for the pillars to withstand the atmospheric pressure exerted on the VIG unit such that maximum visibility through the panes and better thermal insulation are obtained. It is possible that the pillars 4 may create local indentation stress which grows cracks and can affect the lifetime of the VIG unit 1, but due to the larger strength of tempered glass, less pillars are needed and in turn less local indention stress is created. With tempered glass the pillars may be separated with a distance above 35 mm, such as 40 mm or such as 50 mm, thereby minimizing the visible distraction that may be experienced when looking through the glass and minimizing the heat transfer between the glass panes. The pillars may be of any shape sufficient for the pillars to function, such as cylinder, pyramid, conical, circular, rounded shape or a combination thereof. Furthermore the shape may be a complex shape manufactured using an aggregation of different or similar shapes.

Disclosed herein is also a vacuum insulated glazing unit comprising a first tempered glass pane and a second tempered glass pane arranged in parallel, having a surface of each pane opposing each other, a side seal peripherally arranged between the first tempered glass pane and the second tempered glass pane creating an internal void between the glass panes. The side seal may be made from a lead-free frit material, providing recyclable and environmental advantages. Additionally, the side frit seal and the top seal may be made of the same type of frit or they may be made of different types of frits. In one or more aspect, the glass content of the side seal is in an amorphous state and may additionally be classified as a vitreous seal meaning that the seal will soften and deform if reheated.

Disclosed herein is also a vacuum insulated glazing unit comprising a first tempered glass pane and a second tempered glass pane arranged in parallel, having a surface of each pane opposing each other, an evacuation opening comprising an evacuation member, which after having served as an evacuation channel for creating an evacuated internal void, has been closed. In one or more aspects, the evacuation opening may comprise a single diameter or a dual diameter hole, depending on the evacuation member and glazing type used. The evacuation opening may be positioned at any position on the surface of the first glass pane, but it may preferably be positioned near the side edge of the first glass pane, such as near the corner of the first glass pane, so that the evacuation opening with the frit seal and the closed evacuation member does not obscure the visibility through the VIG unit in areas near in the middle of the first glass pane.

In one or more aspects, the evacuation member may be of any structure or material which can initially allow gas to transfer between the interior to the exterior of the VIG unit during the evacuation of the void and which is additionally able withstand the temperature profile of the method without substantial deformation or detachment during the manufacture of the VIG unit. The evacuation member may be closed in order to completely enclose the void, such that gas is prevented from transferring between the outside and inside of the VIG unit during the lifetime of the VIG unit. In a preferred aspect, the evacuation member may be made of a material having a coefficient of thermal expansion (CTE) which is similar to the CTE of the frit material, and preferably also the glass pane. In a further aspect, the evacuation member may be made of glass, for example a glass tube. The closure of the evacuation member may preferably result in a decreased height of the evacuation member, such that the protrusion from the first glass pane is decreased.

Disclosed herein is also a vacuum insulated glazing unit comprising a first tempered glass pane and a second tempered glass pane arranged in parallel, having a surface of each pane opposing each other, a top frit seal made of lead-free solder frit material comprising a glass content, the top frit seal being arranged around the evacuation opening and providing a hermetic seal between the evacuation opening and the evacuation member, such that gas is prevented from transferring between the internal void and the outside of the vacuum insulated unit. Additionally the top frit seal is made of a lead-free frit material, which provides recyclable and environmental advantages. According to the present invention, the top seal may comprise at least one metal oxide such as vanadium oxide ($Va_2O_5$), bismuth oxide ($Bi_2O_3$), tellurium dioxide ($TeO_2$) or zinc oxide (ZnO). The frit seal may additionally also comprise aluminium oxide ($Al_2O_3$), molybdenum trioxide ($MoO_3$) or tungsten trioxide ($WO_3$) or a combination thereof. The metal oxides are able to modify certain properties of the top seal such as the coefficient of thermal expansion (CTE), softening point and adhesive properties. Metal oxides may additionally have an influence on the crystal formation of the glass content during the manufacture of the top seal. Additionally, the coefficient of thermal expansion (CTE) of the top seal may be modified by the added oxides in order to be compatible with the glass pane CTE. This has the advantage that the temperature changes have less impact on finished the vacuum insulated glazing (VIG) unit.

Disclosed herein is also a vacuum insulated glazing unit comprising a first tempered glass pane and a second tempered glass pane arranged in parallel, having a surface of each pane opposing each other, a top frit seal made of lead-free solder frit material comprising a glass content, the top frit seal being arranged around the evacuation opening and providing a hermetic seal between the evacuation opening and the evacuation member such that gas is prevented from transferring between the internal void and the outside of the vacuum insulated unit, wherein the top frit seal comprises an outer surface and an inner part, wherein the outer surface is defined as the boundary layer of the top frit seal between the top frit seal and the outside of the vacuum insulated unit and wherein the glass content within the outer surface is in a crystalline state and the glass content within the inner part is in an amorphous state.

The crystallized glass content having a narrow melting range located at a high temperature ensures that the top frit seal has a large thermal stability, i.e. it can withstand a broad range of temperatures below the melting range without causing leaks and failure of the seal, such as softening and detachment from the glass surfaces. In one or more aspect, the top frit seal produced is characterized as a devitrifying seal, meaning it is made of a frit material comprising a glass content, where the glass content of the frit material is initially in an amorphous state, but during the sealing process some or all of the glass content crystallizes and forms a rigid seal. The molecular structure and characteristics of the material have changed and it will not soften or deform if reheated, even if reheated to the same temperatures of the sealing process. In one or more aspect, 30-100%, such as 50% or such as 80% of the glass content of the top frit seal may be in a crystalline state.

FIGURES

Aspects of the present disclosure will be described in the following with reference to the figures in which.

DETAILED DESCRIPTION

A first aspect of the invention relates to a method of producing a vacuum insulated glazing unit, the vacuum insulated glazing unit comprising, a first tempered glass pane and a second tempered glass pane arranged in parallel, having a surface of each pane opposing each other, pillars arranged as spacers between the opposed surfaces, a side frit material peripherally arranged between the first tempered glass pane and the second tempered glass pane creating an internal void between the glass panes, an evacuation opening in the first glass pane, the evacuation opening comprising an evacuation member, preferably a hollow tube, through which evacuation member the internal void can be evacuated, and a top frit material made of lead-free solder frit material comprising a glass content, the top frit material being arranged around the evacuation opening and comprising a surface defining an exterior boundary of the top frit material between the outside of the vacuum insulated glazing unit and the inside of the top frit material, wherein the glass content thereof is substantially in an amorphous state only, wherein the method comprises the steps of placing an evacuation cup over the evacuation opening, covering a portion comprising at least the evacuation opening, the evacuation member and the top frit material, wherein the evacuation cup comprises a first heat source, and an exhaust opening for evacuating the void, placing the vacuum insulated glazing unit with the evacuation cup in a furnace, heating the top frit material to a heat treatment temperature (Th) by means of the first heat source, maintaining the heat treatment temperature (Th) of the top frit material in the evacuation cup approximately constant for a period of time which is long enough to ensure that glass content near at least the surface of the top frit material is in a state facilitating crystallization, lowering the heat treatment temperature (Th) of the top frit material towards a curing temperature (Tcure) so as to cure the top frit material, and so that the glass content near at least the surface of the top frit material undergoes crystallization, evacuating the void through the evacuation member using a pump connected to the exhaust opening in the evacuation cup, sealing the evacuation member, so as to prevent gas from transferring between the void and the outside of the glass panes thereby obtaining the vacuum insulated glazing unit.

Figure 1:
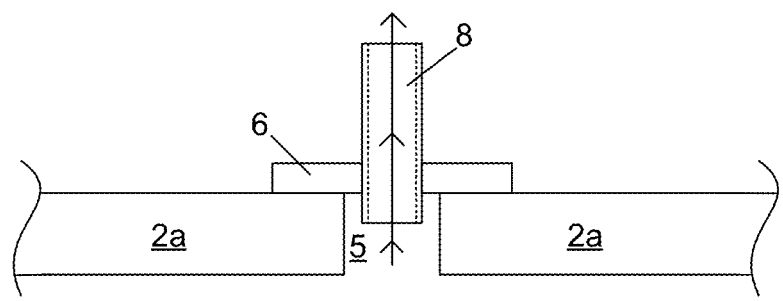
FIG. 1 illustrates a side view of a first glass pane comprising an evacuation opening with an evacuation member and the top frit material.

FIG. 1 illustrates an example of a first tempered glass pane 2a of a VIG unit to be manufactured according to the present invention, where the first tempered glass panes 2a comprises an evacuation opening 5, an evacuation member 8 and a lead-free top frit material 6. The evacuation member 8 is a glass tube 8 allowing air to pass through its hollow centre and it is positioned approximately in the centre of the evacuation opening 5. The top frit material 6 comprises a glass content, a binder, a solvent and at least one metal oxide. The top frit material 6 may be deformable for example such as in a paste-form so that it can be easily applied around the evacuation opening 5 and around the evacuation member 8. In the present example the top frit material 6 and the glass tube 8 are pre-treated such that the top frit material 6 is shaped as a substantially rigid donut-shaped ring and provides a centred hole in which the evacuation tube 8 is placed. It is then possible to place the tube 8 and the top frit material 6 over the evacuation opening 5 simultaneously as an assembled element. The evacuation opening 5 comprises a diameter which is at least around 4 mm, corresponding to the approximate tempered glass pane thickness.

Figure 2:
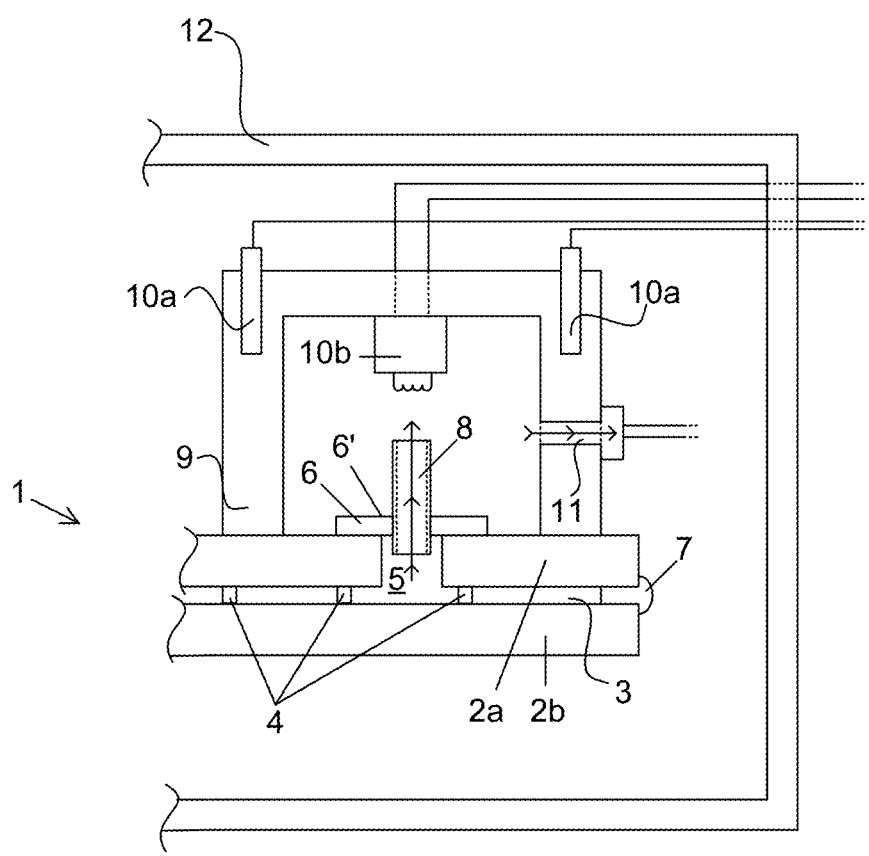
FIG. 2 illustrates a side view of the VIG unit in a furnace.

FIG. 2 shows a part of an exemplary Vacuum Insulated Glazing (VIG) unit 1 comprising the first tempered glass pane 2a as illustrated in FIG. 1 placed in parallel on top of a second tempered glass pane 2b. The first tempered glass pane 2a and the second tempered glass pane 2b (hereafter referred to as the glass panes 2a, 2b) are of substantially the same size and stacked upon each other such that the sides of the first glass pane 2a and second glass pane 2b substantially coincide. The glass panes 2a, 2b could also be stepped so one pane is larger than the other. The sides of the glass panes 2a, 2b are connected using a side frit material 7. In the present example, the side frit material 7 is subsequently heated and cooled to form a side seal 7a substantially simultaneous as to creating the top frit seal 6a. The side frit material 7 is in paste form and provided between the glass panes 2a, 2b along the periphery of the panes 2a, 2b and define a void 3 between the two glass panes 2a, 2b. At least one of the glass pane surfaces facing the void 3 comprises a low-E (low emissivity) surface coating. The low-E coating is removed in the periphery where the side frit material 7 is provided to enhance the contact of the side frit material to the glass pane 2a, 2b. A low-E coating may comprise materials like tin oxide, silver, iridium etc. In one example the low-E coating may be provided on a glass pane surface opposite the void 3 with sufficient coating protection provided.

Additionally, a number of uniformly spaced pillars 4 are positioned in the void 3 between the glass panes 2a, 2b. The pillars 4 provide a minimum distance between the inner surfaces of the glass panes 2a, 2b, that is the upper surface of the lowermost glass pane and the lower surface of the uppermost glass pane, as viewed when the glass panes are placed substantially in a horizontal orientation as in FIG. 2. The pillars 4 have a high compressible strength and may for example comprise stainless steel or ceramic. The pillars 4 maintain the pane gap which is about 0.2 mm. The pane gap may be larger or smaller as long the insulation effect of the VIG unit is substantially maintained. The gap should be large enough to sufficiently reduce heat transfer between panes through conduction heating and small enough to sufficiently restrict heat transfer by convection currents caused by any remnant air. The pillars 4 are spaced 35 mm or more, but preferably no more than 50 mm, and support the gap between the two tempered glass panes 2a, 2b. Such pillar spacing has the advantage that the insulation effect is enhanced while the pillars 4 simultaneously withstand the atmospheric pressure exerted on the VIG unit 1 which is about 10 tons/square meter. Furthermore local indentation stress due to the pillars 4 which may cause cracks and may affect the lifetime of the VIG unit 1 are reduced by reducing the amount of pillars 4 used.

In one or more example, an evacuation cup 9, shaped as a cup with an opening enclosed by a rim, is placed on top of the first glass pane 2a, such that the rim of the evacuation cup 9 is in abutment with the upper surface of the first glass pane 2a and such that it covers a portion comprising at least the evacuation opening 5, the top frit material 6 and the evacuation tube 8. The evacuation cup 9 also covers a part of the first glass pane 2a located in the surrounding near the evacuation opening 5. The rim of the evacuation cup 9 is configured such that it makes a sufficient and preferably hermetic seal between the evacuation cup 9 and the first glass pane 2a. The evacuation cup 9 may only allow a minimum amount of heat transfer between the evacuation cup 9 and the outside of the evacuation cup 9, that is, the air surrounding the VIG unit 1, such that a temperature difference between the inside and the outside can be efficiently obtained. The temperature of the VIG unit 1 which is not comprised in the enclosed portion is not adversely affected by local increase in temperature within the cup 9. In the present example, the evacuation cup 9 comprises a first heat source 10a for heating the inside of the evacuation cup 9 and in particularly the top frit material 6. In an aspect of the present example the first heat source 10a comprises at least one heat cartridge positioned inside the wall of the evacuation cup 9. The evacuation cup 9 also comprises a second heat source 10b for heat-sealing the evacuation tube 8 after evacuation of the void 3. Furthermore the evacuation cup 9 comprises an exhaust opening 11 which can be attached to a pump and be used to evacuate the portion covered by the evacuation cup 9 and thereby also the void 3 via the evacuation tube 8.

As shown in FIG. 2, the VIG unit 1 and the evacuation cup 9 are placed in a furnace 12. The VIG manufacture is performed in the furnace 12 and comprises processes such as firing, fusing, sintering and baking processes. Prior to these processes, the binder material within frit materials 6, 7 are released upon heating, ensuring that the resulting seals become largely free of pores. If the burn-out of binder material hasn't been executed pores may be created from a release of enclosed binder material within the frit materials 6, 7 during the baking process. The furnace 12 is capable of heating the entire VIG unit 1 and its surroundings to a user determined temperature.

In one or more example of the present invention, the side frit material 7 and the top frit material 6 of the VIG unit 1 are heated to a temperature corresponding to a softening temperature (Ts) by means of the furnace 12, prior to heating the top frit material 6 to the heat treatment temperature (Th). The frit materials 6, 7 are fired at this temperature, so that sintering and fusing of the frit materials 6, 7 are initiated. The softening temperature (Ts) is set to a temperature above the softening point, but below the crystallization point, of the frit materials 6, 7. At this temperature the frit materials 6, 7 begin to liquefy and soften to a degree where they are still viscous enough to remain in their original positions but also softened enough to be able to deform. Additionally, the top frit material is heated to the heat treatment temperature (Th) while the furnace 12 continues heating the side frit material 7 at the softening temperature (Ts). The temperature of the top frit material 6 may not be maintained at the softening temperature (Ts), but instead it may continue to increase until the heat treatment temperature (Th) is reached.

Figure 3:
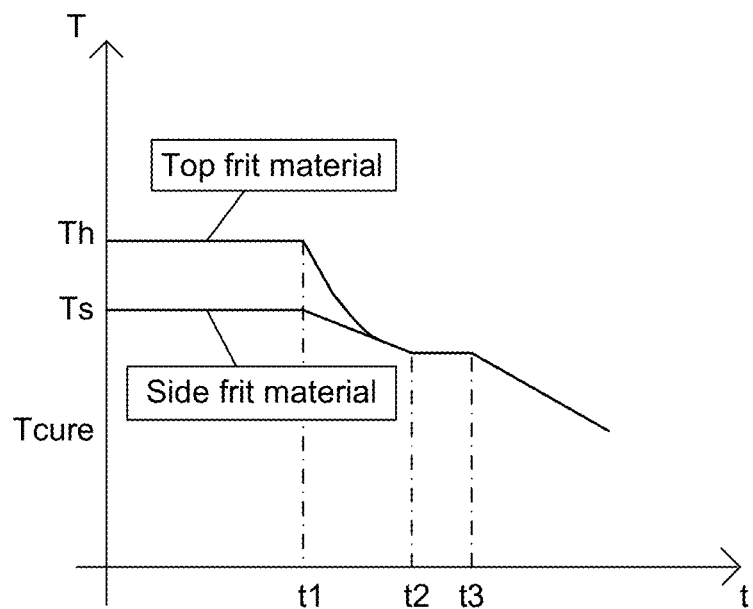
FIG. 3 illustrates a graph showing a relationship between temperature and time in a heat treatment method.

An example of the heat treatment steps of the method of manufacturing the VIG unit 1 is shown in FIG. 3 and illustrates the heat treatment initiated by heating top frit material 6 within the portion enclosed by the evacuation cup 9 by the first heat source 10a to a heat treatment temperature (Th) so that the top frit material 6 is fused and sintered at this temperature. The heat treatment temperature corresponds to a temperature above the softening point of the top frit material 6, at which temperature the top frit material 6 melts.

In one or more example of the invention, the heat treatment temperature (Th) is larger than the softening temperature by 30 degrees Celsius and the heat treatment temperature (Th) is maintained for a period of time of approximately 40 minutes. In an aspect of the example, the side frit material 7 is maintained at the softening temperature (Ts) for approximately the same period of time. The time period allows the side frit material 7 to obtain good wetting at surfaces and create good adhesion. In an aspect of the present example, the combination of heat treatment temperature (Th) of the top frit material 6 and the time period for which it is heated at this temperature allows the amorphous glass content of the top frit material 6 to sufficiently melt. Preferably only parts of the glass content is subsequently solidified to a crystalline structure such that only a part of the molecular elements within the glass obtain the properties related to crystalline glass.

In an aspect of the present example, the softening temperature (Ts) of the side frit material 7, provided by the furnace 12, is approximately 390 degrees Celsius and the heat treatment temperature (Th) of the top frit material 6, provided by the first heat source 10a, is approximately 420 degrees Celsius. The corresponding temperature of the air within the cup 9 is approximately 460 degrees Celsius.

At time t1 in FIG. 3, after the elapse of the 40 minute time period at the heat treatment temperature (Th), the VIG unit temperature, provided by the furnace 12 and temperature of the portion enclosed by the evacuation cup 9 provided by the first heat source 10a, are lowered such that the temperature of the frit materials 6, 7 are changed towards a curing temperature (Tcure) between 300-360 degrees Celsius. As shown in FIG. 3 the temperature of the top frit material 6 and the temperature of the side frit material 7 may not rapidly reach the same temperature, i.e. there exists an initial temperature difference between the frit materials 6, 7.

In one or more example, prior to reaching the curing temperature (Tcure) the evacuation of the void 3 can be initiated, while the temperatures of the frit materials 6, 7 are still continuously decreasing. For example, the evacuation may be initiated after the frit materials 6, 7 reach a temperature above the curing temperature (Tcure), such as at approximately 370 degrees Celsius and while the temperatures are still continuously decreasing.

In one or more example and as illustrated in FIG. 3, the evacuation of the void 3 is initiated at the curing temperature (Tcure) reached at time t2 and the frit materials 6, 7 are allowed to settle and cure at the curing temperature (Tcure) prior to being exposed to vacuum pressure. As an example the curing temperature (Tcure) is between 325-375 degrees Celsius and the frit materials 6, 7 are allowed to settle for approximately 10 minutes.

Maintaining the top frit material 6 at the curing temperature (Tcure) for e.g. 10 minutes allows the crystals within the top frit material 6 to form and settle and it ensures that the desired viscosity of the side frit material 7 has been obtained prior to the evacuation.

In an aspect of the present example, the decreased temperature allows a certain degree of solidification of the top frit material 6. The solidification process is controlled such that the crystal growth may be initiated and completed. The specified time period corresponds to the time sufficient to allow the crystal growth to reach the desired amount of crystallization and crystal sizes within the top frit material 6 prior to evacuation. Preferably the glass content of the top frit material 6 is not completely crystallized but instead there exist a mix of amorphous and crystallized content. A mixture of crystal sizes, such as between 15 and 40 microns, may be obtained in the top frit seal 6a. The crystals may be distributed uniformly within the top frit seal 6a or they may be most pronounced at the surface of the top frit seal 6a', so that the surface possesses the advantageous crystalline properties such as making it more rigid and strong. Additionally as the top frit material 6 cures and solidifies, the top frit material 6 continues to adhere to the relevant glass surfaces of the VIG unit 1.

The rigidity and viscosities of the side frit materials 6, 7 upon evacuation of the void 3 have influence for the VIG unit manufacturing method. The viscosity generally decreases with increasing temperature, and at high temperatures the viscosity can become too low for the VIG manufacturing process. Low viscosity of the frit material 6, 7, results in a frit material 6, 7 which can be largely deformed and possible sucked into the void 3 due to vacuum and/or capillary motion, causing leaks and failure of the peripheral side seal 7a and top seal 6a at the evacuation opening 5. The crystallization of the glass content of the top frit material 6 provides a top frit seal 6a sufficiently rigid to withstand the pressures applied during the evacuation step, while maintaining its sealing properties. But a side frit material which is too rigid can provide consequences for the VIG unit manufacturing process. If the side frit material 7 is too rigid, then it will not deform as the pressure in the void 3 is decreased and the glass panes 2a, 2b start to move towards each other, causing local undesirable stresses within the glass panes 2a, 2b at the periphery of the glass panes 2a, 2b. At temperatures between 325-375 degrees Celsius the viscosity of the side frit materials 7 is within the functional range of viscosities for the initiation of the evacuation step.

According to the present example illustrated in FIG. 3, at time t3, after the frit materials 6, 7 have been allowed to settle, the evacuation process is initiated and a pump connected to the exhaust opening 11 of the evacuation cup 9 will start evacuating the cup 9 and the void 3 via the evacuation tube 8. At this time t3, the temperatures of the frit materials 6, 7 may continue to decrease towards lower temperatures.

Due to the present method comprising a heat treatment step of the top frit material 6 at the heat treatment temperature (Th), the top frit material 6 is substantially foam-free and stable when exposed to low pressures during the entire evacuation step over a large temperature range, mainly due to the crystallized content of the top frit material 6 which has a melting point at a higher temperature than the melting point temperature of the glass content when in an amorphous state. The reduced amount of foaming of the top frit material 6 in turn reduces the risk of leaks in the resulting top frit seal 6a.

The void 3 may contain contaminants and impurities such as organic and inorganic substances originating from the frit materials 6, 7 and the glass panes 2a, 2b due to degassing or temperature variations or UV light. These contaminants may interfere with the quality of the Low-E coatings on the wall, decreasing the quality of such coating. In general, increasing the temperature of the VIG unit 1 increases the amount of vaporized contaminants. The relatively high temperature at which the void 3 can be evacuated allows the thermal cleaning of the void 3 to be initiated and executed at a high temperature, resulting in a more efficient cleaning process. The thermal cleaning of the void 3 is sufficiently done at a temperature of at least 275 degrees Celsius. Above this temperature the contaminants and impurities are vaporized and may be readily removed during the evacuation of the void 3.

During the evacuation of the void 3, the void 3 is decompressed to a pressure no higher than 0.001 mbar. During the decompression of the void 3, the glass panes 2a, 2b move towards each other and further promotes the peripheral joining process of the glass panes 2a, 2b due to the side frit material 7. The volume of the void 3 is decreased until the pillars 4 are in contact with the glass panes 2a, 2b. The pillars 4 spaced between the glass panes 2a, 2b, prevent bulking of the glass panes towards the void 3. Optionally the panes 2a, 2b may be pressed towards the void 3 by applied external force or pressure to ensure distribution of stress among the pillars 4 and the side frit material 7. When the sufficient pressure within the void 3 is reached, the evacuation tube 8 is sealed.

Figure 4:
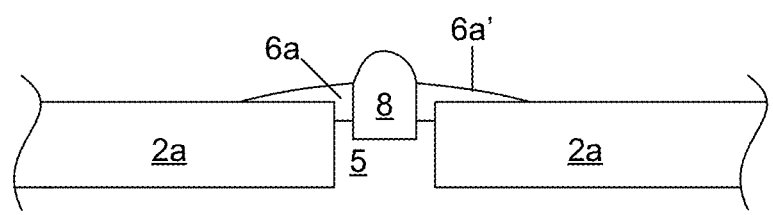
FIG. 4 illustrates a side view of a first glass pane comprising a sealed opening sealed by a heat treated top frit material and a sealed evacuation member.

In the present example, the evacuation tube 8 is sealed by heating the tip of the tube 8 to a sealing temperature (Tseal) of about 1000 degrees Celsius for about 10 seconds by the second heat source 10b. In an aspect of the present example the second heat source 10b comprises a coil heat element. This melts the tip and reduces the height of the tube end protruding from the first glass pane 2a as shown in FIG. 4. The VIG unit 1 is then cooled and provides the resulting VIG unit 1.

The heat treatment of the top frit material 6 at the heat treatment temperature (Th) also creates a top seal 6a which is substantially resistant to deformation and foaming during the sealing of the tube tip. The crystallized top frit material can withstand the relatively short burst of intense heat and maintain its sealing properties. In one or more aspect of the present invention, the top frit material 6 can be further protected by using a heat shield, having a shape covering the top frit material 6 and also parts of the first glass pane 2a under the evacuation cup 9, but not covering the evacuation tube 8. The sealing of the tube 8, provides a void 3 which is hermetically sealed from the outside of the VIG unit 1.

The side frit material 7 and the top frit material 6 ultimately forms the hermetic solder glass side seal 7a and top seal 6a respectively, after being heated to the softening temperature (Ts) and the heat treatment temperature (Th) and subsequently cooled and solidified according to the present invention. The frit seals provided by the present method using top frit material 6 and the side frit material 7 are both substantially solid in the sense that they prevent the glass panes 2a, 2b from working relative to each other. This has the advantage that the glass panes 2a, 2b curve less due to temperature difference between inside and outside of the VIG unit 1 (known as temperature differential) and this can help distribute the stresses in the VIG unit 1. Another advantage is that the glass panes 2a, 2b have less relative movement and the pillars 4 have reduced motion. FIG. 4 shows a section of the VIG unit 1 comprising the finished top seal 6a produced by the present method. The seal 6a is rigid, hermetic and adhering to the tube 8 and the first glass pane 2a. The VIG unit 1 is expected to have a lifetime of 15 years or more.

Figure 5:
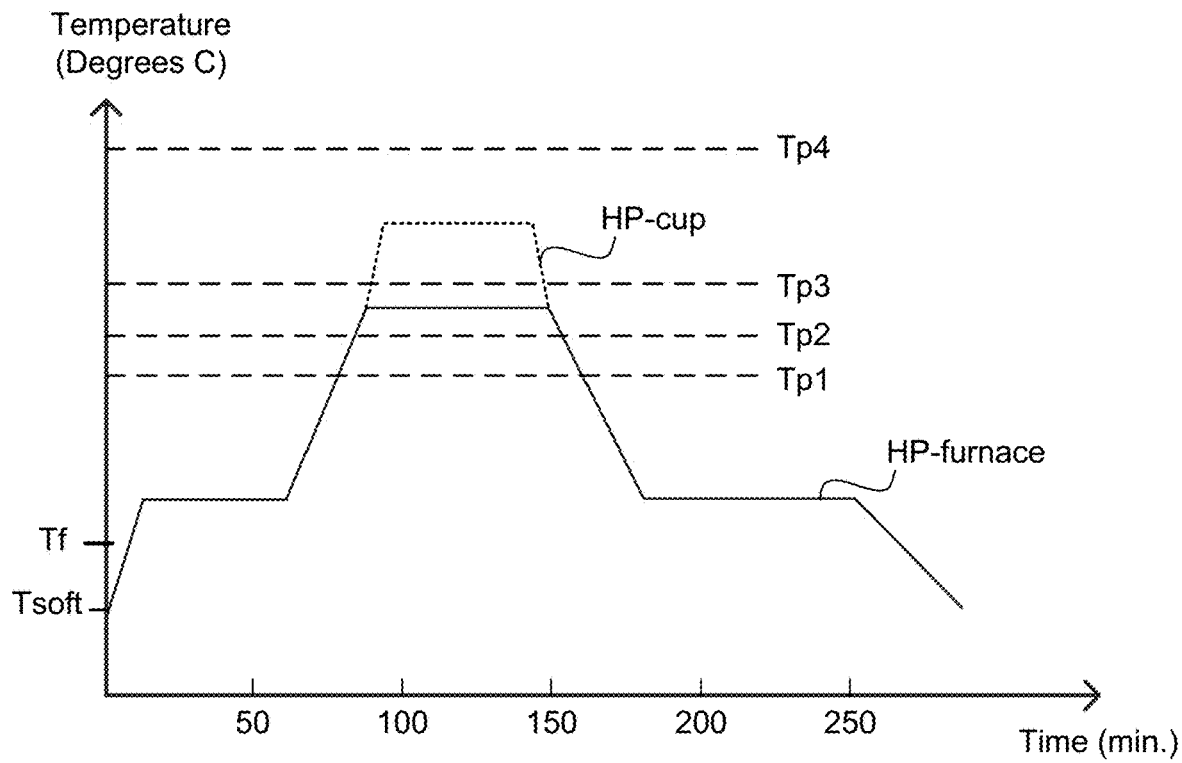
FIG. 5 illustrates a graph showing an exemplary heating program for a furnace and a cup within a furnace, compared with points of physical transformation of a top frit material.

FIG. 5 shows an exemplary heat treatment profile (HP-furnace) for a furnace 12, where in the furnace 12 a VIG unit 1 is arranged with a cup 9 placed over the top frit 6, where an exemplary heat profile for the cup 9 is also shown (HP-cup). The cup 9 is arranged to provide additional heating to the top frit 6 of the VIG unit 1 during the execution of the heating by the furnace 12 according to the heat treatment profile (HP-furnace). For comparison exemplary of points of interest for the thermal behaviour of a lead-free frit material is indicated in the graph. These points include the softening point (Tsoft), the flow point (Tf) and four crystallization peak points (Tp1), (Tp2), (Tp3) and (Tp4). As shown, the cup 9 is set to heat to a heat treatment temperature (Th) above three of the crystallization peak points so as to increase the possibility of inducing crystallization of the frit material. The possibility of initiating crystallization may additionally depends on the time maintaining the heat treatment temperature (Th), in the present example the heat treatment temperature (Th) is maintained for about 50 min, but could also be maintained at 40 min, so as to provide a particular efficient top frit seal 6a.

In one or more examples, the heat treatment temperature (Th) is 420 degree C., the first crystallization peak point (Tp1) is around 360-370 degrees, the second crystallization peak point (Tp2) is around 375-385 degrees C., the third crystallization peak point (Tp3) is around 400-410 degrees C. and the fourth crystallization peak point (Tp4) is around 455-465 degrees C. The temperature provided by the cup 9 may be dependent on the type of frit material used and may be modulated to fit to the thermodynamic characteristics of the type of frit material in order to obtain an efficient top frit seal 6a, without compromising with the overall quality of the VIG unit 1.

Figure 6:
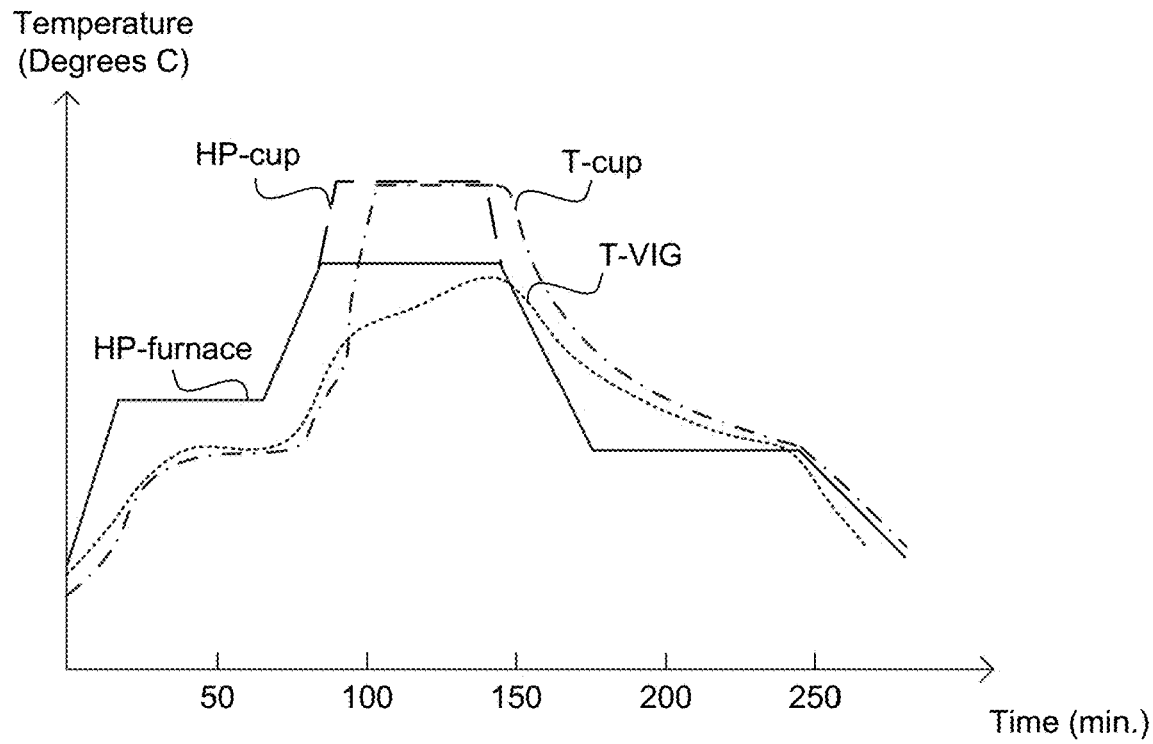
FIG. 6 illustrates a graph showing an exemplary heating program for a furnace and a cup, as well as measured temperatures of the glass panes of the VIG unit and cup within the furnace.

FIG. 6 shows an exemplary heat profile (HP-furnace) for a furnace 12, where in the furnace a VIG unit 1 is arranged with a cup 9 placed over the top frit 6, where an exemplary heat profile for the cup 9 is also shown (HP-cup). Furthermore, the temperature under the cup (T-cup) and the temperature of the VIG unit 1 (T-VIG) is furthermore shown, illustrating the effect of the applied heat on the temperature of the VIG unit 1 and under the cup 9, indicating the temperature of the VIG elements covered by the cup 9 as the cup 9 is arranged to provide additional heating to the top frit 6 during the execution of the heating by the furnace 12 according to the heat treatment profile (HP-furnace). In a preferred example, the furnace 12 only heat the VIG unit 1 to temperatures below 400 degrees C., and the temperature of the VIG unit 1, not covered by the cup 9, is seen to stay below the maximum temperature of the heat profile of the furnace 12 (HP-furnace). The cup 9 provides a local heating of the top frit 6 to a heat treatment temperature above 400 degrees C. so as to induce structural changes to the frit material 6.

Figure 7A:
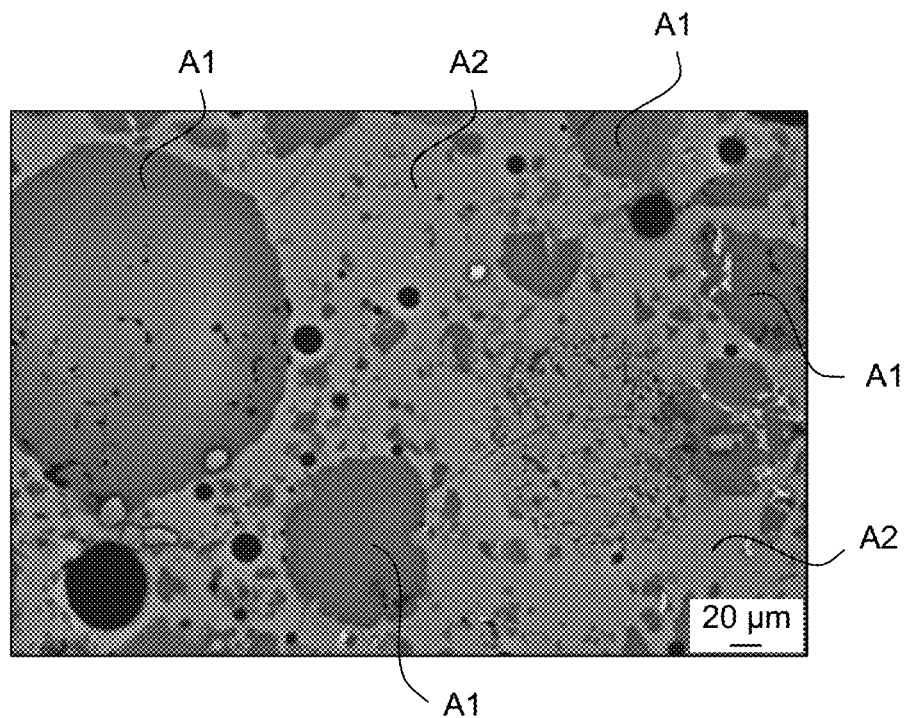
FIG. 7 shows two SEM images acquired from frit samples heated to different temperatures.
Figure 7B:
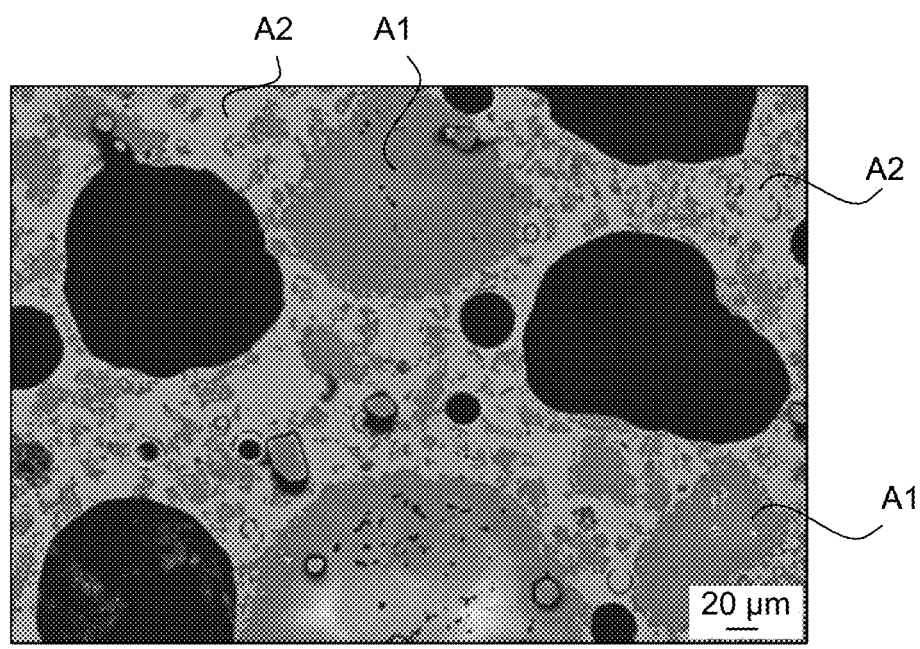

FIG. 7a and FIG. 7b shows an example of two frit samples which have been heated using different heat treatment temperatures and thereafter, their structure is compared using scanning electron microscopic (SEM) imaging. The samples are of the same frit type and comprise elements such as Ag, V, Te, Zr Si and O. Sample 1 (FIG. 7a) is heated to a temperature of 300 degrees C., by a heat rate of 450 c/h and thereafter maintained at said temperature of 300 degrees C. for 40 min. Sample 2 (FIG. 7b) is heated to a temperature of 390 degrees C. by a heat rate of 450 C/h and maintained at 390 degrees C. for 40 min. Generally, the additional energy applied to sample 2 compared facilitates an increased probability of inducing structural changes, e.g. resulting from phase transitions. The frit type used experiences physical transformations occurring at different temperatures of the frit material 6, the behaviour of the frit type with change increase in temperature is similar to those indicated for the frit material 6 in FIG. 5. Heating above one or more of the temperatures at which crystallization peaks are identified, should facilitate crystallization of the frit material 6. The frit material 6 of sample 1 and sample 2 has a first crystallization peaks around 360 degrees C., indicating that the frit material 6 should be heated above 360 degrees C. in order to initiate crystallization.

The results of the two different heat treatments of the frit material 6 are shown in FIGS. 7a and 7b. The overall difference in the structure of the material as shown in the images of the frit materials 6 indicate that the additional heat supplied to sample 2 induces a change in the structural properties of the sample. The SEM image in FIG. 7a and FIG. 7b shows areas, denoted A1, having a high concentration of the elements Si, Zr and O, as indicated on the image. Areas surrounding these A1 areas and denoted A2 comprise a high concentration of Ag, V and Te materials. There is a large occurrence of large sized particles in FIG. 7a, while in FIG. 7b, there is both a large occurrence of large sized particles as well as a high occurrence of small sized particles. Specifically, it is seen that these small sized particles occurs at edges of the large sized particles and they furthermore seem to aggregate and create islands of small sized particles. The glass transition temperature of the two heat treated samples occurs at different temperatures, sample 2 having a glass transition temperature at a higher temperature than sample 1, which indicates that the particles observed are crystallites resulting from the heating above crystallization peak(s) of the frit material. Less foaming and deterioration of the frit seal 6a is observed for a seal heat treated similar to sample 2, which facilitates a VIG unit manufacturing method which can initiate evacuation of the void a high temperature which in turns provides a more efficient evacuation and cleaning process as well as a side seal in a physical condition particularly advantageous for the sealing process, e.g. having a viscosity suited for the edge seal. Generally, using a heat treated top frit material 6 according to the present invention, the temperature, at which evacuation can be executed, may be much higher than when using conventional methods.

In one or more examples, the glass content of the frit material 6 may become superficial crystallized, fully crystallized or partly crystallized, where the superficial crystallization provides a crystallization of the glass content at the surface of the frit material 6. After sufficient time and heat applied to the frit material 6 it may become fully crystallized. The partly crystallized frit is where the frit material 6 comprises both crystallized and amorphous glass content e.g. providing a resulting seal 6a comprising a surface of crystallized frit material and where the remaining frit seal 6a is partly crystallized.

REFERENCES

1 Vacuum insulated glazing unit
2a First glass pane
2b Second glass pane
3 Void
4 Pillars
5 Evacuation opening
6 Top frit material
6' Surface of top frit material
6a Top seal
6a' Surface of top frit seal
7 Side frit material
7a Side seal
8 Evacuation member 9 Evacuation cup
10a First heat source
10b Second heat source
11 Exhaust opening
12 Furnace
Ts Softening temperature
Th Heat treatment temperature
Tcure Curing temperature
T Temperature
Tsoft Softening point
Tf Flow point
T-VIG Temperature of the VIG unit
T-cup Temperature under the cup
Tp1 First crystallization peak point
Tp2 Second crystallization peak point
Tp3 Third crystallization peak point
Tp4 Fourth crystallization peak point
t Time
t1 Time of lowering the softening temperature (Ts) and the heat treatment temperature (Th) towards the curing temperature (Tcure).
t2 Time of reaching the curing temperature (Tcure).
t3 Time of further lowering the temperatures of the frit materials.
A1 Areas within SEM image comprising a high concentration of Si, O and Zr materials.
A2 Areas within SEM image comprising a high concentration of Ag, V and Te materials.
HP-cup Heat profile for the cup
HP-furnace Heat profile for the furnace

The invention claimed is:

1. A method of producing a vacuum insulated glazing unit, the vacuum insulated glazing unit comprising:
    a first tempered glass pane and a second tempered glass pane arranged in parallel, having a surface of each pane opposing each other,
    a plurality of pillars arranged as spacers between the opposed surfaces,
    a side frit material peripherally arranged between the first tempered glass pane and the second tempered glass pane creating an internal void between the glass panes,
    an evacuation opening in the first glass pane, the evacuation opening comprises an evacuation member through which the evacuation member the internal void can be evacuated, and
    a top frit material made of lead-free solder frit material comprising a glass content, the top frit material being arranged around the evacuation opening and comprising a surface defining an exterior boundary of the top frit material between the outside of the vacuum insulated glazing unit and the inside of the top frit material, wherein the glass content thereof is in an amorphous state,
wherein the method comprises the steps of:
    placing an evacuation cup over the evacuation opening, covering a portion comprising at least the evacuation opening, the evacuation member and the top frit material, wherein the evacuation cup comprises a first heat source, a second heat source, and an exhaust opening for evacuating the internal void,
    placing the vacuum insulated glazing unit with the evacuation cup into a furnace,
    heating the vacuum insulated glazing unit using the furnace to a softening temperature (Ts),
    heating the top frit material to a heat treatment temperature (Th) using the first heat source, wherein the heat treatment temperature (Th) provided by the first heat source is greater than the softening temperature (Ts) provided by at least the furnace,
    maintaining the heat treatment temperature (Th) of the top frit material in the evacuation cup at about the same temperature for a time sufficient to ensure that glass content at the surface of the top frit material is in a state facilitating crystallization,
    lowering the heat treatment temperature (Th) of the top frit material towards a curing temperature (Tcure) so as to cure the top frit material, and so that the glass content at the surface of the top frit material undergoes crystallization,
    evacuating the internal void through the evacuation member using a pump connected to the exhaust opening in the evacuation cup, and
    sealing the evacuation member at a sealing temperature (Tseal) using a second heat source that is different from the first heat source and the furnace, so as to prevent gas from transferring between the internal void and the outside of the glass panes thereby obtaining the vacuum insulated glazing unit.

2. The method according to claim 1, wherein the evacuation member is a tube.

3. The method according to claim 1, wherein the top frit material comprises:
    at least one solvent and at least one binder material,
    at least one metal oxide selected from vanadium oxide ($V_2O_5$), bismuth oxide ($Bi_2O_3$), tellurium dioxide ($TeO_2$), or zinc oxide (ZnO),
    or a combination thereof.

4. The method according to claim 1, wherein the heat treatment temperature (Th) of the top frit material is lowered towards the curing temperature (Tcure) such that:
    only the glass content at the surface of the top frit material undergoes crystallization.

5. The method according to claim 1, wherein the top frit material provides a hermetic seal between the evacuation member and the evacuation opening during the lowering, the evacuating, and the sealing.

6. The method according to claim 1, wherein the top frit material is foam-free during at least the evacuating step.

7. The method according to claim 1, wherein the heat treatment temperature (Th) is:
    from 380-460 degrees Celsius, and/or
    maintained for at least 10 minutes.

8. The method according to claim 1, wherein the side frit material is heated at the softening temperature (Ts) during the method steps of heating the top frit material to the heat treatment temperature (Th) and maintaining the heat treatment temperature (Th) of the top frit material in the evacuation cup at about the same temperature, wherein
    the softening temperature (Ts) is maintained approximately constant during the method steps of heating the top frit material to the heat treatment temperature (Th) and maintaining the heat treatment temperature (Th) of the top frit material in the evacuation cup at about the same temperature, and/or
    the heat treatment temperature (Th) is greater than the softening temperature (Ts) by at least 10 degrees Celsius, and/or
    the heat treatment temperature (Th) is greater than the softening temperature (Ts) by at least 5%, and/or
    the heat treatment temperature (Th) is maintained for a period of time between 10 and 60 minutes, and/or
    the difference between the heat treatment temperature (Th) and the softening temperature (Ts) is no larger than 100 degrees Celsius, and/or the softening temperature (Ts) is between 320-390 degrees Celsius.

9. The method according to claim 1, wherein portions of the glass panes that are not covered by the evacuation cup are maintained at a temperature below about 400 degrees Celsius during at least the method steps of heating the top frit material to the heat treatment temperature (Th) and maintaining the heat treatment temperature (Th) of the top frit material in the evacuation cup approximately constant.

10. The method according to claim 1, wherein the curing temperature (Tcure) is from 275-380 degrees Celsius.

11. The method according to claim 1, wherein the heat treatment temperature (Th) of the top frit material is lowered towards the curing temperature (Tcure) such that at least 80% of the glass content near the surface of the top frit material undergoes crystallization.

12. The method according to claim 1, wherein the heat treatment temperature (Th) of the top frit material is lowered towards the curing temperature (Tcure) such that at least 50% of the glass content within the top frit material undergoes crystallization.

13. The method of claim 1, wherein the heat treatment temperature (Th) of the top frit material is lowered towards the curing temperature (Tcure) such that the entire glass content in the top frit material undergoes crystallization.

14. The method of claim 1, wherein the heat treatment temperature (Th) is:
   between 380-460 degrees Celsius, and/or
   maintained for a period of time between 3 and 60 minutes.

15. The method according to claim 1, wherein the evacuation of the internal void is initiated while:
   the temperature of the side frit material and the temperature of the top frit material are lowered towards the curing temperature (Tcure), or
   the temperature of the side frit material and the temperature of the top frit material are at the curing temperature (Tcure).

16. A method of producing a vacuum insulated glazing unit, the vacuum insulated glazing unit comprising:
   a first glass pane and a second glass pane arranged in parallel, having a surface of each pane opposing each other,
   a plurality of pillars arranged as spacers between the opposed surfaces,
   a side frit material peripherally arranged between the first glass pane and the second glass pane creating an internal void between the glass panes,
   an evacuation opening in the first glass pane, the evacuation opening comprising an evacuation member through which the evacuation member the internal void can be evacuated, and
   a top frit material made of lead-free solder frit material arranged around the evacuation opening,
   wherein the method comprises the steps of:
      placing an evacuation cup over the evacuation opening, covering a portion comprising at least the evacuation opening, the evacuation member, and the top frit material, wherein the evacuation cup comprises a first heat source, a second heat source, and an exhaust opening for evacuating the internal void,
      placing the vacuum insulated glazing unit with the evacuation cup into a furnace,
      heating the side frit material and the top frit material to a softening temperature (Ts) with the furnace,
      heating the top frit material to a heat treatment temperature (Th) with using the first heat source, wherein the heat treatment temperature (Th) is larger than the softening temperature (Ts) by at least 5 degrees Celsius,
      maintaining the heat treatment temperature (Th) of the top frit material and the softening temperature (Ts) of the side frit material for at least 3 min,
      lowering the heat treatment temperature (Th) of the top frit material and the softening temperature (Ts) of the side frit material towards a curing temperature (Tcure),
   evacuating the internal void through the evacuation member using a pump connected to the exhaust opening in the evacuation cup, and
   sealing the evacuation member at a sealing temperature (Tseal) using a second heat source that is different from the first heat source and the furnace, so as to prevent gas from transferring between the internal void and the outside of the glass panes and thereby obtaining the vacuum insulated glazing unit.

17. The method according to claim 16, wherein the first glass pane and the second glass pane are tempered glass panes.

* * * * *